(No Model.)

J. F. WINCHELL.
CORN HARVESTER.

No. 510,946. Patented Dec. 19, 1893.

WITNESSES:
H. M. Plaisted
F. B. Ernest

INVENTOR
James Frank Winchell,
BY H. A. Toulmin
HIS ATTORNEY.

UNITED STATES PATENT OFFICE.

JAMES F. WINCHELL, OF SPRINGFIELD, OHIO, ASSIGNOR TO THE FOOS MANUFACTURING COMPANY, OF SAME PLACE.

CORN-HARVESTER.

SPECIFICATION forming part of Letters Patent No. 510,946, dated December 19, 1893.

Application filed September 1, 1892. Serial No. 444,805. (No model.)

*To all whom it may concern:*

Be it known that I, JAMES F. WINCHELL, a citizen of the United States, residing at Springfield, in the county of Clark and State of Ohio, have invented certain new and useful Improvements in Corn-Harvesters, of which the following is a specification, reference being had therein to the accompanying drawings.

My invention relates to certain new and useful improvements in corn harvesters.

The object of my improvements is to provide a cheap and simple corn harvester possessing especial advantages and peculiarities which will be hereinafter fully described and particularly pointed out in the claims.

My improvements have reference to blade-carrying wings pivoted to a supporting frame on substantially horizontal pivots, one being farther inside of the outer edge of the frame than the other, whereby a forward projecting ledge to support the said wing is formed and other advantages hereinafter described are secured; have reference to inclining the pivotal axes of the said wings to effect compactness of construction when folded; have reference to a sled forming the supporting frame, and a pivoted wheel to turn the same; and to points of detail hereinafter described and claimed.

Figure 1:
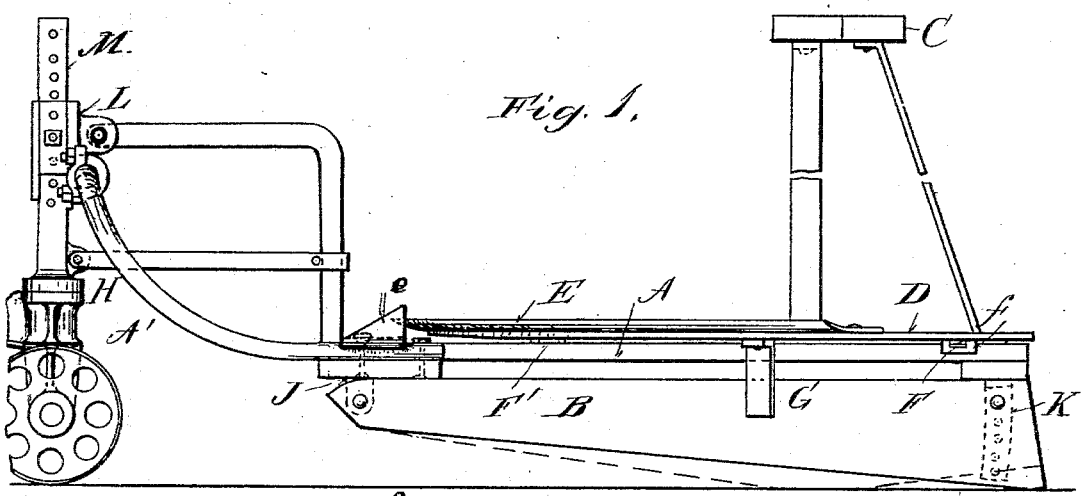
Figure 2:
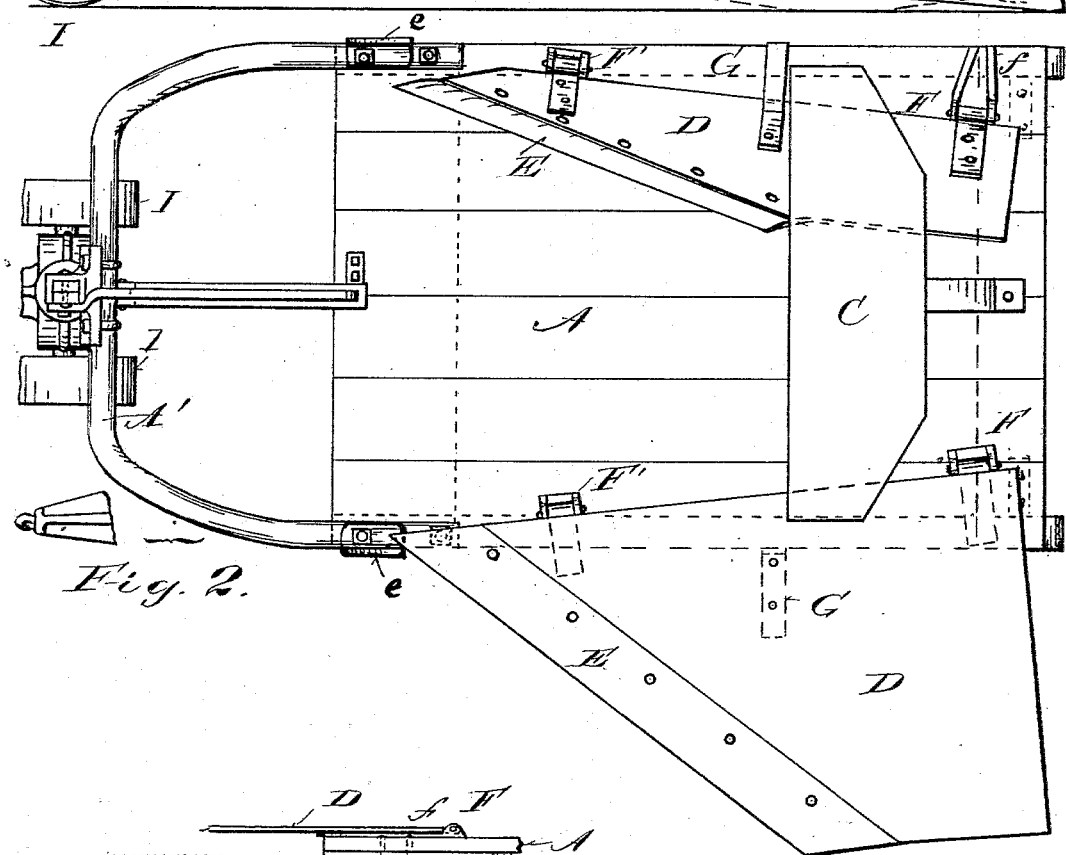

In the accompanying drawings on which like reference letters indicate corresponding parts: Figure 1, represents a side elevation of my machine; Fig. 2, a plan view thereof with one blade down and the other up; and Fig. 3, a partial end view showing the rear adjustment.

The letter A designates a platform supported on runners B, preferably inclined as shown in Fig. 1, so that their rear ends may receive the main weight of the machine. The object of this shape will presently appear. On the sled is secured a seat C, and at either side thereof are blade-wings D, carrying blades E, inclined, as shown in Fig. 2, to the direction of motion. These wings are pivoted to the frame or platform by hinges F, F', the axes of which are located a considerable distance in from the side of the platform, and are inclined to the platform and to each other, as shown in Fig. 2. The hinge F is preferably provided with a supporting projection *f*, extending outward, whereon rests the wing when in its cutting position. A brace G is secured to the blade-wing away from its inner edge, as shown in Fig. 2, and adapted to press against the side of the sled when the blade is down, and brace the latter at that point. This overlapping of the platform by the blade-wings, effects a firm and rigid support for the said wings, and likewise carries the projecting brace G inside of the frame, when the wing is folded as shown in Fig. 2. The angularity of the pivotal axis allows sufficient room for the driver in front when the blades are folded, and also carries the blades inward at their rear ends to effect a compactness of construction and arrangement, the advantage of which will be readily apparent.

The front end of the sled or platform is supported by the forward projecting loop A' of the frame, upon center plates H, carried by a pivoted wheel I, preferably double, as shown in Fig. 2. The rear of the sled receives the principal weight of the harvester and its load, while the pivoted support for the front end, allows of readily turning the machine at the end of the rows and elsewhere. This is a point of practical advantage, and I lay claim broadly to a sled having a wheel for this purpose; also to the same with the above construction of the runners, and front supporting and guiding wheel.

Referring to Fig. 1, the dotted lines show another shape for the runner which has the supporting part at a little distance from the rear end, instead of as shown by the full lines in this figure. It will be observed, however, that this form shown by dotted lines will still allow of turning the sled vertically about on the flat bearing portion of the runner, with the aid of the guiding and supporting wheel carried by the front end of the frame.

Figure 3:
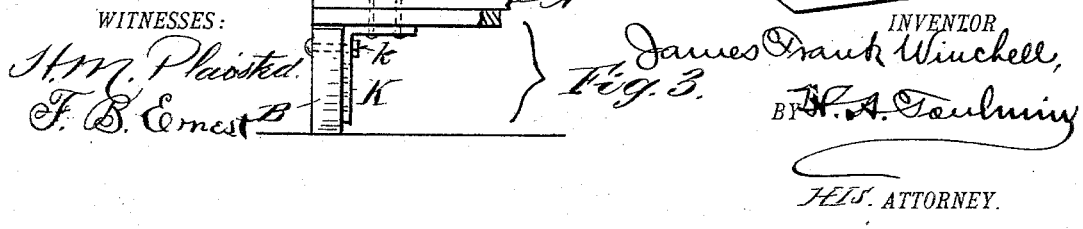

In order to adjust the cutting blades to the height of cut desired, I have pivoted the platform A, to the front end of the sled by means of an angle iron J, at each runner, and rounded off the nose to allow of raising the rear end about said pivot point. The rear end is provided with an angle iron K at each runner, firmly secured to the platform, but adapted to be adjusted at various distances above the rear ends of the runners, by means of a bolt K and matching holes in the angle iron, as indicated in Figs. 1 and 3.

The front end of the frame, supported in the bracket L on the head post M, may be adjusted vertically by matching holes in said head piece and bracket. By raising the front end of the machine the platform is inclined, backward; by then raising the rear end as above described, the platform is made horizontal but in a higher plane, giving a higher cut on the stalks. In other words the forward adjustment inclines the whole platform more or less, and the same is restored to a horizontal plane by adjusting the rear connection between the sled and runners.

It will be observed that the blade-carrying wings are unsupported by any outer brace or device resting on the ground, but are wholly supported by their pivot and braced connection with the vehicle platform and side. The brace G is sufficiently long to engage with the side of the sled under ordinary adjustments of the rear end as above described.

The machine thus presents a simple compact arrangement easily adjustable, readily operated, cheap to manufacture, and within the reach of most farmers.

Referring to Figs. 1 and 2, it will be seen that the forward end of the blade E is above the platform. When the corn stalks are inclined or lying down over the platform, they are apt to wedge themselves within the space between the blade and the platform, and obstruct the machine. To avoid this I provide a stalk guide, consisting of an inclined web or ridge e, and a plate-portion, curved to fit the pipe forming the lap A' of the platform, and fastened thereto by one of the bolts, as shown in Figs. 1 and 2. The forward end of the blade projects within this guide, and the stalks falling thereon ride up the web till they reach the blade E, and are there cut. This is a practical point of considerable advantage in the operation of the machine.

Having thus fully described my invention, what I claim as new, and desire to secure by Letters Patent, is—

1. In a corn harvester, the combination with a platform, and a guiding wheel supporting one end of said platform, of sled runners pivoted to said platform at one of their ends, and adjustable with regard to the said platform at their other ends.

2. In a corn harvester, the combination with a platform, and a guiding wheel supporting one end of said platform and pivotally mounted to allow of turning, of sled runners pivoted at their forward ends to said platform to the rear of said guiding wheel on a horizontal axis, the lower edges of the runners inclining downward and rearward to a bearing point near their rear ends, and means to adjust the rear of said platform toward and away from the rear ends of said runners.

3. In a corn harvester, the combination with a platform and an inclined blade carried thereby, whose forward end stands above the platform, of a stalk guide mounted in front of the forward end of the blade, and extending upward from the platform and above the blade, and having a guiding surface to deflect the falling corn stalks to said blade and prevent their wedging between the blade and the platform.

4. In a corn harvester, the combination with a platform and sled runners pivoted thereto at their forward ends, of angle irons K carried by the rear of said platform adjacent to the rear of said runners, means to secure said irons adjustably to said runners at different heights of the platform therefrom, and a supporting wheel adjustably secured to the forward end of said platform to elevate said forward end corresponding to the adjustment of the lower end.

In testimony whereof I affix my signature in presence of two witnesses.

JAMES F. WINCHELL.

Witnesses:
H. M. PLAISTED,
WARREN M. McNAIR.